(12) United States Patent
Seo et al.

(10) Patent No.: US 8,514,217 B2
(45) Date of Patent: Aug. 20, 2013

(54) APPARATUS AND METHOD FOR DRIVING LIGHT SCANNER

(75) Inventors: Jung Hoon Seo, Seoul (KR); Jae Sung Kim, Seoul (KR); Jae Wook Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 273 days.

(21) Appl. No.: 12/991,995

(22) PCT Filed: May 15, 2009

(86) PCT No.: PCT/KR2009/002599
§ 371 (c)(1),
(2), (4) Date: Nov. 24, 2010

(87) PCT Pub. No.: WO2009/139606
PCT Pub. Date: Nov. 19, 2009

(65) Prior Publication Data
US 2011/0063505 A1  Mar. 17, 2011

Related U.S. Application Data

(60) Provisional application No. 61/053,657, filed on May 15, 2008.

(30) Foreign Application Priority Data

Jul. 21, 2008 (KR) .......................... 10-2008-0070499

(51) Int. Cl.
*G06F 3/038* (2013.01)
(52) U.S. Cl.
USPC .......................................... 345/213; 345/537

(58) Field of Classification Search
None
See application file for complete search history.

(56) References Cited

U.S. PATENT DOCUMENTS

| 7,729,028 B2 * | 6/2010 | Lach et al. ................. 359/202.1 |
| 2002/0047090 A1 | 4/2002 | Sakurai et al. |
| 2003/0030757 A1 | 2/2003 | Shim |
| 2008/0001850 A1 * | 1/2008 | Champion et al. ............... 345/7 |

FOREIGN PATENT DOCUMENTS

| EP | 0749247 A1 | 12/1996 |
| JP | 2007-140263 A | 6/2007 |
| KR | 10-2000-0023136 A | 4/2000 |
| KR | 10-2004-0086046 A | 10/2004 |
| KR | 10-2005-0031206 A | 4/2005 |

* cited by examiner

*Primary Examiner* — Sumati Lefkowitz
*Assistant Examiner* — Duane N Taylor, Jr.
(74) *Attorney, Agent, or Firm* — Birch, Stewart, Kolasch & Birch, LLP

(57) ABSTRACT

An apparatus for driving a light scanner and method thereof are disclosed. The present invention includes an apparatus for driving a light scanner, which scans an image on a screen, the apparatus comprising the light scanner driven by a drive signal, a sensing unit sensing a driving of the light scanner, a pixel clock signal generating unit generating a pixel clock signal by detecting a 90-degree phase difference between the drive signal and a sensing signal sensed by the sensing unit, a sync signal adjusting unit adjusting vertical and horizontal sync signals of an input video according to the pixel clock signal and a driving unit driving the light scanner according to the adjusted horizontal and vertical sync signals.

11 Claims, 8 Drawing Sheets

APPARATUS AND METHOD FOR DRIVING LIGHT SCANNER

This application is the National Phase of PCT/KR2009/002599 filed on May 15, 2009, which claims the benefit under 35 U.S.C. 119(e) of U.S. Provisional Application No. 61/053,657 filed on May 15, 2008, and claims priority under 35 U.S.C. 119(a) to Patent Application No. 10-2008-0070499 filed in Republic of Korea on Jul. 21, 2008, all of which are hereby expressly incorporated by reference into the present application.

TECHNICAL FIELD

The present invention relates to an apparatus for driving a light scanner, and more particularly, to an apparatus for driving a light scanner and method thereof. Although the present invention is suitable for a wide scope of applications, it is particularly suitable for compensating for a driving error of the light scanner.

BACKGROUND ART

Generally, as the multimedia society is developing rapidly, the demands for a large-scale display screen and high image quality thereof has risen. Recently, it becomes important to implement natural colors smoothly in addition to high resolution.

In order to implement perfect natural colors, it is essential to use such a light source of high color purity as a laser. And, one of devices for implementing images using laser is a laser projection display device using a light scanner.

The laser projection display device implements images in a manner of scanning a light, which is generated from a laser light source, on a screen using a light scanner.

In this case, a driving speed of the light scanner should be high to implement images of high resolution.

In particular, the high driving speed of the light scanner means that a driving angle of the light scanner should be large.

The light scanner tends to have an increasing driving angle if a drive signal has a specific frequency. And, the specific frequency of the drive signal for increasing the driving angle of the light scanner is called a resonant frequency.

Hence, if a drive signal corresponds to a resonant frequency, a light scanner has a largest driving angle and enables its high-speed driving.

Yet, since a light scanner has a resonant frequency that varies due to manufacturing deviations on process, there are many difficulties in generating a drive signal corresponding to a resonant frequency by considering these manufacturing deviations.

Moreover, the resonant frequency of the light scanner may vary due to intensity of light incident on the light scanner in addition to the manufacturing deviations on process.

In particular, as intensity of light incident on a light scanner is unit uniform, a temperature of the light scanner varies according to a time. And, a resonant frequency of the light scanner varies according to the time, correspondingly.

However, according to a related art, a light scanner has been driven by generating vertical and horizontal drive signals from a standard video format without considering a resonant frequency of a light scanner.

Hence, the light scanner fails to be driven in correspondence with the inputted vertical and horizontal drive signals due to the varying resonant frequency but generates errors from being driven.

The driving errors of the light scanner cause a problem of changing a left/right portion of a displayed image in part, a problem of changing a top/bottom portion of the displayed image in part, and/or a problem of making an overall image displayed very small.

Therefore, the demand for developing a system capable of compensating for inputted horizontal and vertical sync signals in consideration of a resonant frequency of a light scanner is rising.

DISCLOSURE OF THE INVENTION

Technical Problem

An object of the present invention is to provide an apparatus for driving a light scanner and method thereof, by which a driving error of a light scanner can be compensated for in a manner of generating a pixel clock by detecting a 90-degree phase difference between a drive signal inputted to the light scanner and a sensing signal sensed from the light scanner and then adjusting horizontal and vertical sync signals using the generated pixel clock.

Technical Solution

Accordingly, the present invention is directed to an apparatus for driving a light scanner and method thereof that substantially obviate one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, an apparatus for driving a light scanner, which scans an image on a screen, according to the present invention includes the light scanner driven by a drive signal, a sensing unit sensing a driving of the light scanner, a pixel clock signal generating unit generating a pixel clock signal by detecting a 90-degree phase difference between the drive signal and a sensing signal sensed by the sensing unit, a sync signal adjusting unit adjusting vertical and horizontal sync signals of an input video according to the pixel clock signal, and a driving unit driving the light scanner according to the adjusted horizontal and vertical sync signals.

Preferably, the pixel clock signal generating unit includes a phase detecting unit detecting a 90-degree phase difference between a sensing signal of the sensing unit and a drive signal of the driving unit, a filter unit outputting a control voltage in which a frequency component of the detected phase difference is limited, and a voltage control oscillating unit oscillating a frequency corresponding to the control voltage.

Preferably, the sync signal adjusting unit includes a memory configured to store an inputted video signal and a sync signal generating unit generating the vertical and horizontal sync signals from the stored video signal, the sync signal generating unit configured to adjust the generated horizontal and vertical sync signals according to the pixel clock signal inputted from the pixel clock signal generating unit.

More preferably, the sync signal generating unit adjusts the horizontal sync signal to enable a descending interval, in which a horizontal drive signal of the light scanner descends high to low, to be located between pulses of the horizontal sync signal. And, the adjusted horizontal sync signal is shifted according to the pixel clock signal without changing a pulse width or a length between the pulses.

Preferably, the sync signal generating unit adjusts the vertical sync signal to enable an ascending interval, in which a vertical drive signal of the light scanner ascends low to high, to be increased. And, a pulse width and a length between pulses of the adjusted vertical sync signal are changed.

To further achieve these and other advantages and in accordance with the purpose of the present invention, a method of driving a light scanner, which scans an image on a screen includes the steps of applying a drive signal to the light scanner, sensing a driving of the light scanner, generating a pixel clock signal by detecting a 90-degree phase difference between the drive signal and a sensing signal of the sensing step, adjusting vertical and horizontal sync signals of an input video according to the pixel clock signal, and driving the light scanner according to the adjusted horizontal and vertical sync signals.

Preferably, the step of adjusting the vertical and horizontal sync signals of the input video includes the steps of storing the inputted video signal, generating the vertical and horizontal sync signals from the stored video signal, and adjusting the generated horizontal and vertical sync signals according to the inputted pixel clock signal.

More preferably, the horizontal sync signal is adjusted by being shifted to enable a descending interval, in which a horizontal drive signal of the light scanner descends high to low, to be located between pulses of the horizontal sync signal without changing a pulse width or a length between the pulses.

More preferably, the vertical sync signal is adjusted by changing a pulse width and a length between pulses to enable an ascending interval, in which a vertical drive signal of the light scanner ascends low to high to be increased.

It is to be understood that both the foregoing general description and the following detailed description are exemplary and explanatory and are intended to provide further explanation of the invention as claimed.

Advantageous Effects

Accordingly, the present invention provides the following effects or advantages.

First of all, the present invention is able to compensate for a driving error of a light scanner in a manner of generating a pixel clock by detecting a 90-degree phase difference between a drive signal and a sensing signal sensed from the light scanner and then adjusting horizontal and vertical sync signals using the generated pixel clock.

Secondly, the present invention is able to provide a user with distortion-free images in a manner of compensating for a driving error of a light scanner in consideration of a resonant frequency of the light scanner that varies according to a peripheral environment.

In particular, the present invention is able to solve a problem of changing a left/right portion of a displayed image in part, a problem of changing a top/bottom portion of the displayed image in part and/or a problem of making an overall image displayed very small in a manner of shifting to adjust a horizontal sync signal by not changing but shifting a pulse width or a pulse-to-pulse length to enable a descending interval, in which a horizontal drive signal of a light scanner descends high to low, to be located between a pulses of the horizontal sync signal and adjusting a vertical sync signal by changing a pulse width and a pulse-to-pulse length to increase an ascending interval in which a vertical drive signal ascends low to high.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE

Mode For Invention

Reference will now be made in detail to the preferred embodiments of the present invention, examples of which are illustrated in the accompanying drawings.

Figure 1:
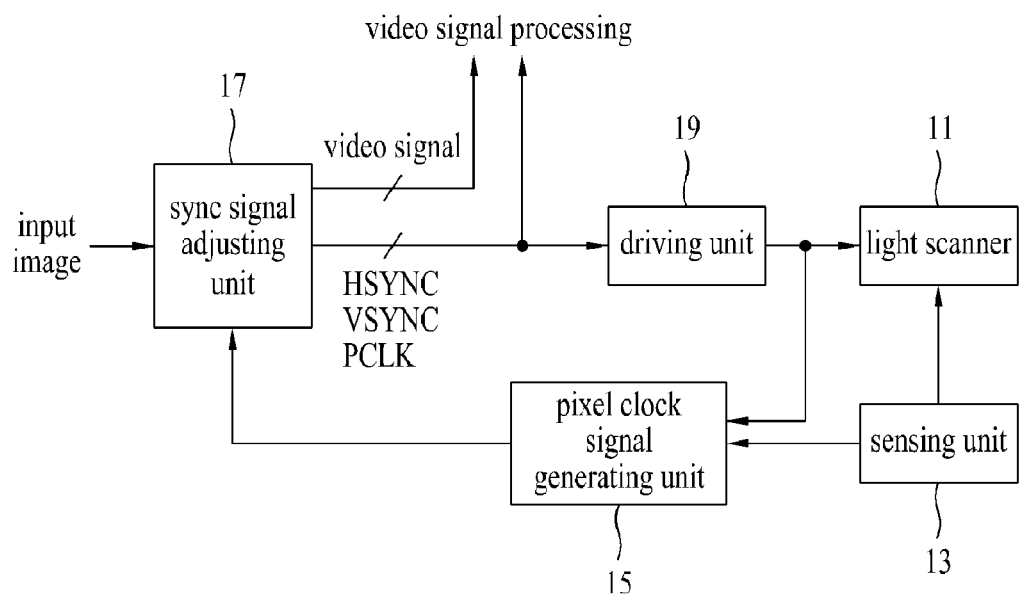
FIG. 1 is a block diagram of an apparatus for driving a light scanner according to the present invention.

FIG. 1 is a block diagram of an apparatus for driving a light scanner according to the present invention.

Referring to FIG. 1, an apparatus for driving a light scanner according to the present invention can include a light scanner 11, a sensing unit 13, a pixel clock signal generating unit 15, a sync signal adjusting unit 17 and a driving unit 19.

In this case, the light scanner 11 is MEMS (micro-electromechanical system) scanner and is resonantly driven by a drive signal that is phase-shifted by 90 degrees.

The sensing unit 13 senses a driving of the light scanner 11. and, the pixel clock signal generating unit 15 plays a role in generating a pixel clock signal by detecting a 90-degree phase difference between a drive signal applied to the light scanner 11 and a sensing signal generated by the sensing unit 13.

Subsequently, the sync signal adjusting unit 17 adjusts vertical and horizontal sync signals of an input image according to the pixel clock signal. The driving unit 19 is then able to compensate for a driving error of the light scanner 11 by driving the light scanner 11 according to the adjusted horizontal and vertical sync signals.

Figure 2:
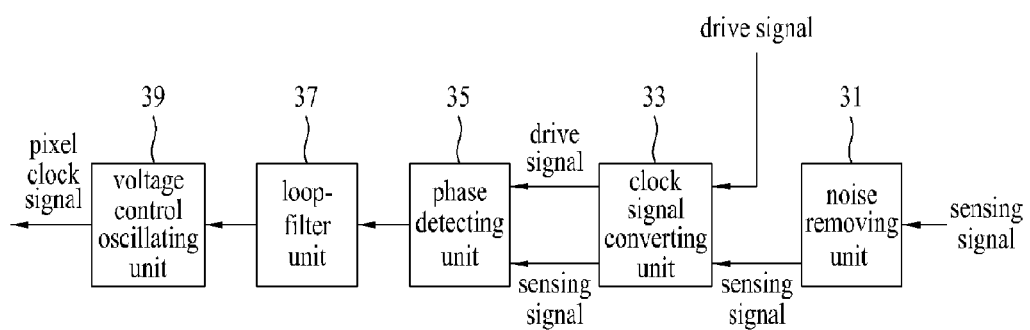
FIG. 2 is a block diagram of a pixel clock signal generating unit shown in FIG. 1.

FIG. 2 is a block diagram of a pixel clock signal generating unit shown in FIG. 1.

Referring to FIG. 2, a pixel clock signal generating unit can include a noise removing unit 31, a clock signal converting unit 33, a phase detecting unit 35, a loop-filter unit 37 and a voltage control oscillating unit 39.

First of all, the noise removing unit 31 removes noise from a sensing signal. And, the clock signal converting unit converts the noise-removed sensing signal and a drive signal of the driving unit 19 to a clock signal and then outputs the clock signal to the phase detecting unit 35.

In this case, the noise removing unit 31 removes the noise by amplifying horizontal and vertical sensing signals differentially using a differential amplifier and is able to play a role in adjusting an offset of the differentially-amplified horizontal and vertical sensing signals using an offset adjuster.

Subsequently, the phase detecting unit 35 detects a 90-degree phase difference between a sensing signal sensed by the sensing unit 13 and a drive signal generated by the driving unit 19. The loop-filter unit 37 outputs a control voltage by limiting a frequency component of the detected phase difference. And, the voltage control oscillating unit 39 generates a pixel clock signal, in which a phase difference between the drive signal and the sensing signal is fixed to 90 degrees, by oscillating a frequency corresponding to the control voltage.

Thus, the present invention fixes the phase difference between the drive signal and the sensing signal to 90 degrees using the pixel clock signal generating unit 15.

This is because the light scanner 11 has a maximum Q factor value when the phase difference between the drive signal of the driving unit 19, which becomes a reference signal, and the sensing signal which becomes a comparison signal.

Hence, in order for the light scanner 11 to be driven at a maximum angle, the phase difference should be fixed to 90 degrees.

Subsequently, the pixel clock signal, of which phase is fixed to 90 degrees through the pixel clock signal generating unit 15, is inputted to the sync signal adjusting unit 17 to adjust a horizontal sync signal and a vertical sync signal for an external video signal that is inputted.

Figure 3:
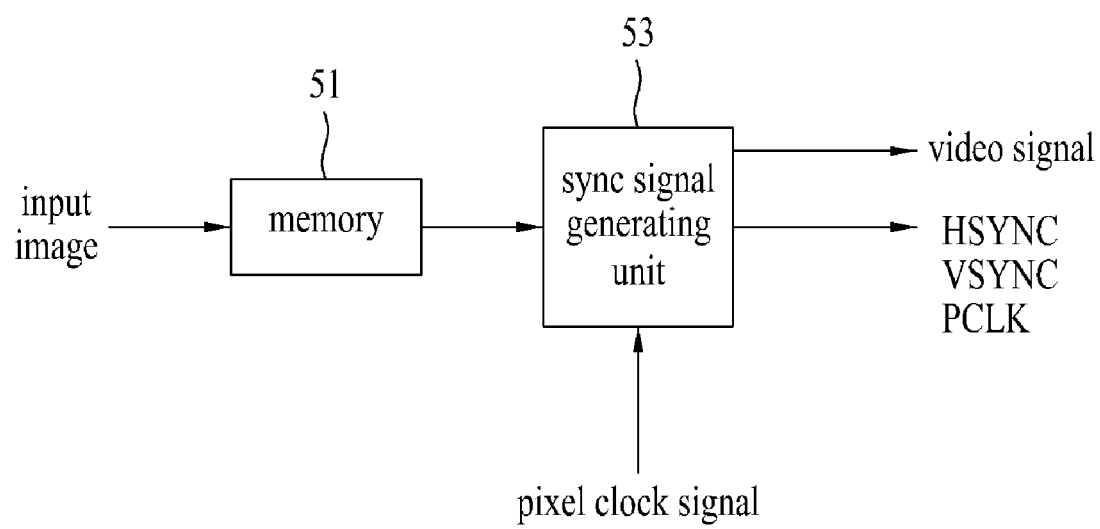
FIG. 3 is a block diagram of a sync signal adjusting unit shown in FIG. 1.

FIG. 3 is a block diagram of a sync signal adjusting unit shown in FIG. 1.

Referring to FIG. 3, a sync signal adjusting unit can include a memory and a sync signal generating unit 53.

In this case, the memory 51 plays a role in storing an inputted external video signal. And, the sync signal generating unit 53 generates horizontal and vertical sync signals from the stored video signal and plays a role in adjusting the generated horizontal and vertical sync signals according to the pixel clock signal inputted from the pixel clock signal generating unit.

The sync signal generating unit adjusts the horizontal sync signal to enable a descending interval, in which a horizontal drive signal of a light scanner descends high to low, to be located between pulses off the horizontal sync signal.

In this case, the adjusted horizontal sync signal can be shifted according to the pixel clock signal without changing a pulse width or a length between pulses.

And, the sync signal generating unit adjusts the vertical sync signal to enable an ascending interval, in which a vertical drive signal of the light scanner ascends low to high, to be increased.

In this case, a pulse width or a pulse-to-pulse length of the adjusted vertical sync signal is changeable.

Figure 4:
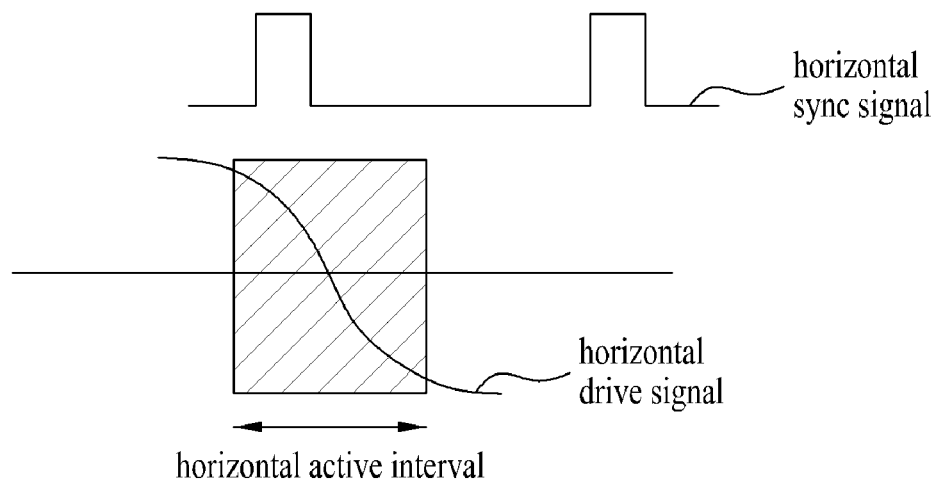
FIG. 4 and FIG. 5 are diagrams for adjusting a horizontal sync signal according to a pixel clock signal.
Figure 5:
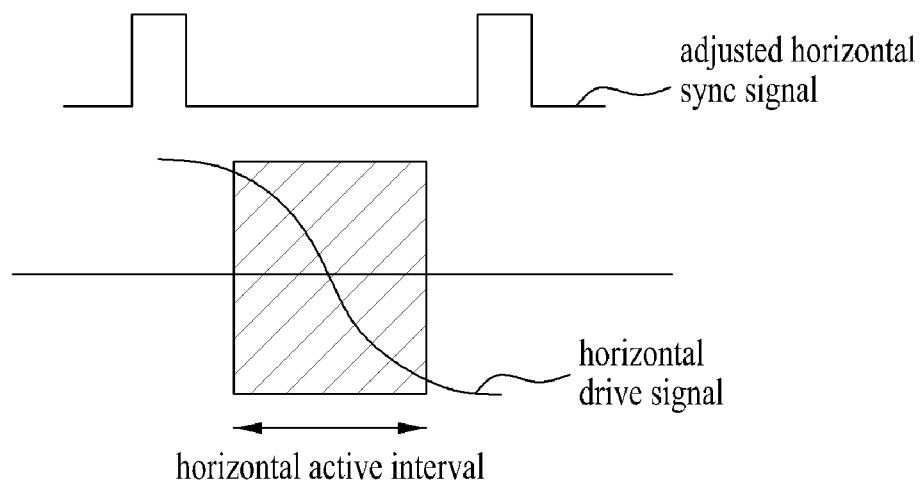

FIG. 4 and FIG. 5 are diagrams for adjusting a horizontal sync signal according to a pixel clock signal. FIG. 4 is a diagram of a horizontal sync signal before adjustment and FIG. 5 is a diagram of a horizontal sync signal after adjustment.

For example, referring to FIG. 4, if a light scanner is driven by a prescribed horizontal sync signal, the light scanner is driven faster not by an applied horizontal sync signal but by an intrinsic resonant frequency. Therefore, an active interval for displaying an image does not exist between pulses of the horizontal sync signal.

In this case, the active interval, in which an image is displayed, means a descending interval in which a horizontal drive signal applied to the light scanner descends high to low.

Therefore, a left/right portion of an actually displayed image may be changed. Moreover, since a drive angle of the light scanner is small, a size of the displayed image may be small.

In order to compensate for the driving error of the light scanner, a horizontal sync signal is adjusted using a pixel clock signal in which a phase difference between a drive signal and a sensing signal is fixed to 90 degrees.

Referring to FIG. 5, a horizontal sync signal is shifted to enable an active interval, in which an image is displayed, to exist between pulses of the horizontal sync signal.

In particular, a horizontal sync signal can be adjusted by being shifted in a manner of enabling a descending interval, in which a horizontal drive signal descends high to low, to be located between pulses of the horizontal sync signal instead of changing a pulse width or a pulse-to-pulse length.

Figure 6:
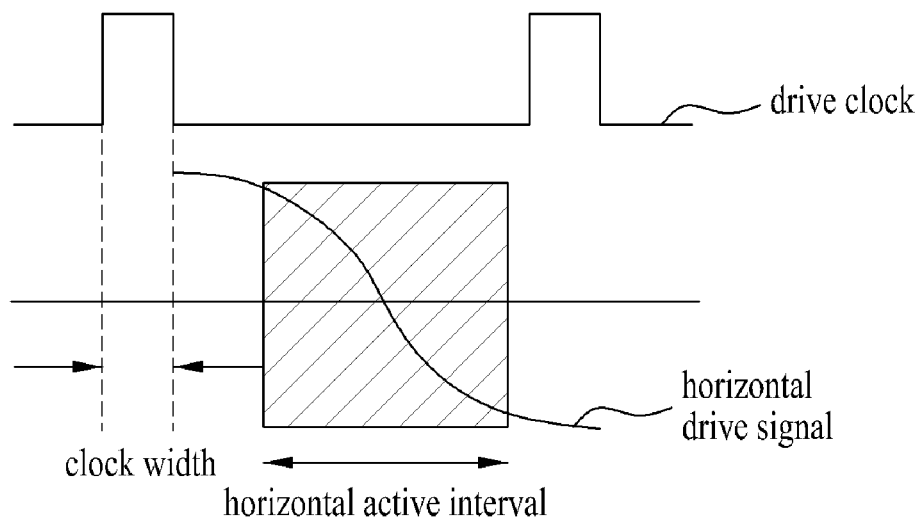
FIG. 6 and FIG. 7 are diagrams for a shift of a drive clock of a light scanner.
Figure 7:
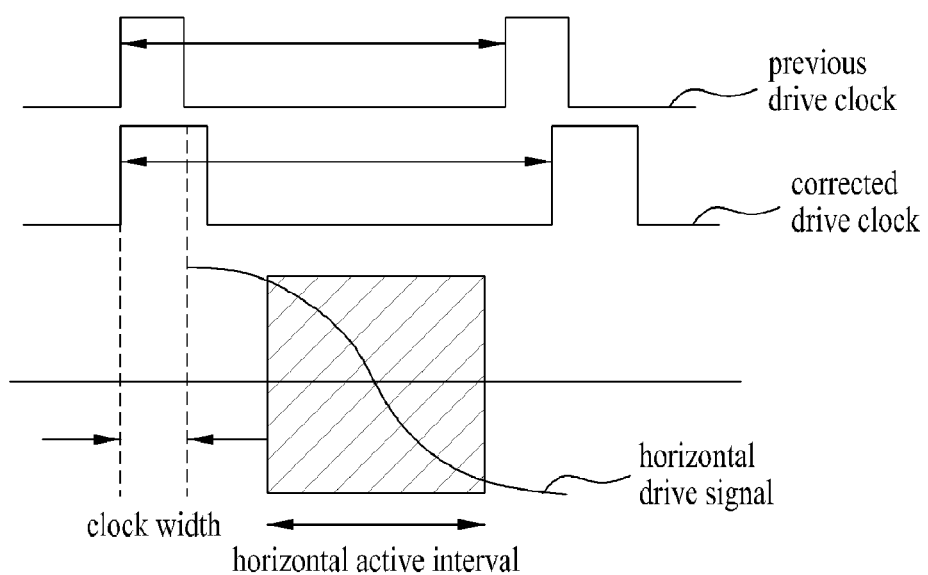

FIG. 6 and FIG. 7 are diagrams for a shift of a drive clock of a light scanner. In particular, FIG. 6 is a diagram of a drive clock before shift and FIG. 7 is a diagram of a drive clock after shift.

Referring to FIG. 6, if a light scanner is driven without adjusting a horizontal sync signal, an active interval for displaying an image in a drive clock of the light scanner does not exist between pulses of a horizontal drive clock by a resonant frequency.

On the contrary, referring to FIG. 7, if a light scanner is driven by adjusting a horizontal sync signal, a pulse width and a distance between pulses are increased to enable an active interval for displaying an image to exist between pulses of a horizontal drive clock. Thus, it is able to compensate for a driving error of the light scanner.

Figure 8:
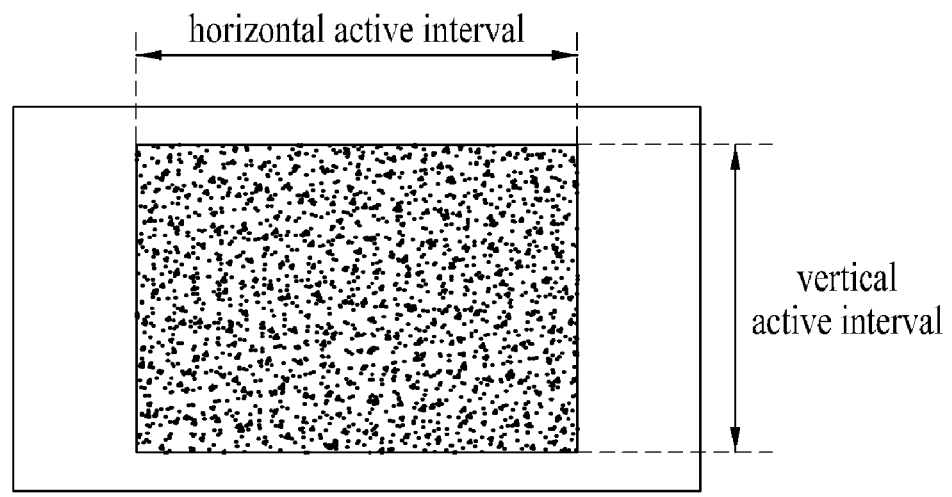
FIG. 8 and FIG. 9 are diagrams of horizontal and vertical intervals of a standard image and a vertical sync signal.
Figure 9:
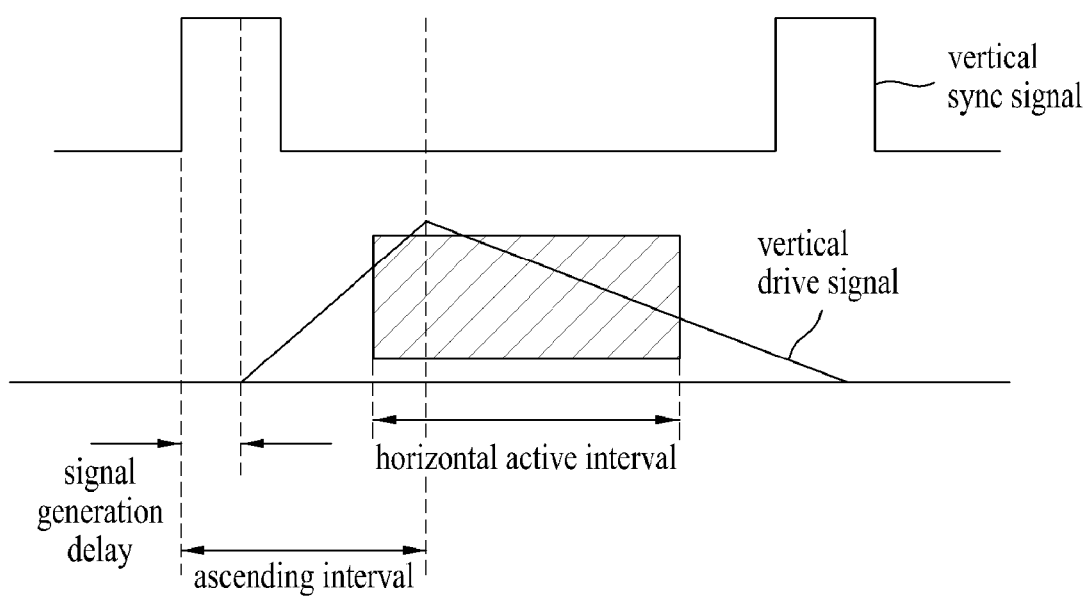
Figure 10:
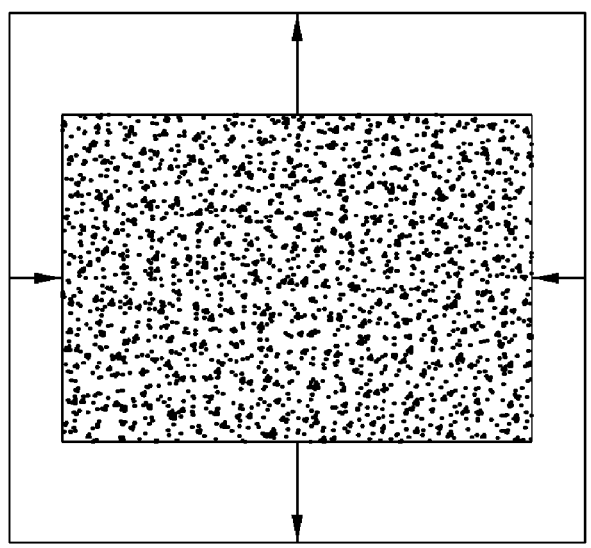
FIG. 10 and FIG. 11 are diagrams of horizontal and vertical intervals of an image according to a light scanner driving of the present invention and a vertical sync signal adjusted according to a pixel clock signal, respectively.
Figure 11:
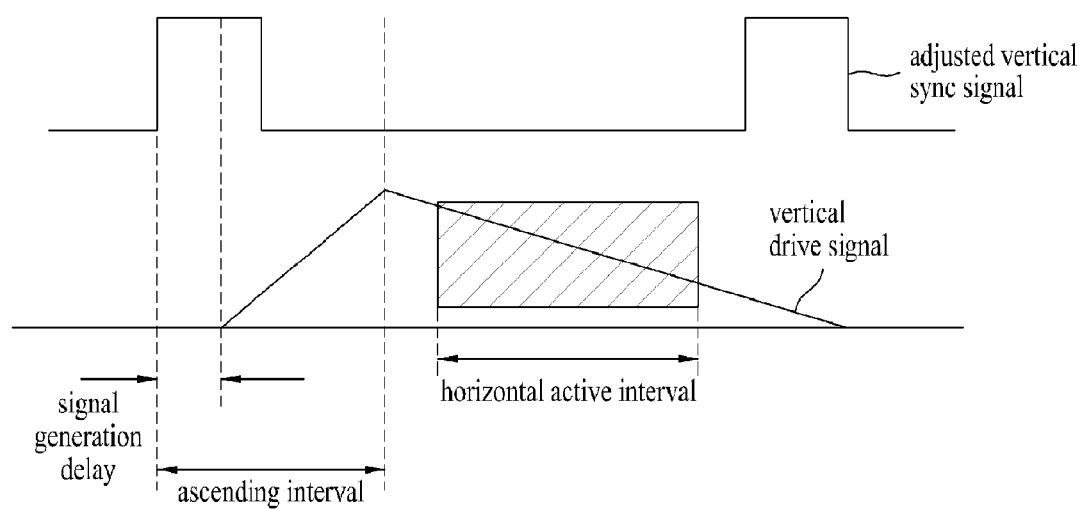

Meanwhile, FIG. 8 and FIG. 9 are diagrams of horizontal and vertical intervals of a standard image and a vertical sync signal and FIG. 10 and FIG. 11 are diagrams of horizontal and vertical intervals of an image according to a light scanner driving of the present invention and a vertical sync signal adjusted according to a pixel clock signal, respectively.

Referring to FIG. 8 and FIG. 9, if a light scanner is driven by a vertical sync signal of a standard image having a prescribed horizontal interval and a prescribed vertical interval, the light scanner is not driven by an intrinsic resonant frequency according to an applied vertical sync signal. Hence, an active interval for displaying an image does not exist in a descending interval of a vertical drive signal.

Therefore, a top/bottom portion of an actually displayed image is changed in part.

In this case, an active interval for displaying an image means a descending interval in which a vertical drive signal of a light scanner descends high to low.

In order to compensate for the driving error of the light scanner, a vertical sync signal is adjusted using a pixel clock signal in which a phase difference between a drive signal and a sensing signal is fixed to 90 degrees.

Referring to FIG. 10 and FIG. 11, it is able to adjust a vertical sync signal to further decrease a horizontal interval of a standard image and to further increase a vertical interval.

In particular, by increasing an ascending interval of a vertical drive signal of a light scanner in a manner of increasing a pulse width of a vertical drive signal and a distance between pulses of the vertical drive signal, an active interval is made to exist in a descending interval of the vertical drive signal.

In other words, it is able to adjust a vertical sync signal by changing a pulse width and a length between pulses to enable an ascending interval, in which a vertical drive signal of a light scanner ascends low to high, to be increased.

Figure 12:
FIG. 12 is a diagram of a standard image of which top and bottom are switched.
Figure 13:
FIG. 13 is a diagram of a standard image of which vertical sync signal is compensated by the present invention.

FIG. 12 is a diagram of a standard image of which top and bottom are switched, and FIG. 13 is a diagram of a standard image of which vertical sync signal is compensated by the present invention.

Referring to FIG. 12 and FIG. 13, although an image is displayed in a manner that top and bottom portions of the displayed image are switched by a driving error of a light scanner, if the driving error of the light scanner is compensated by the driving method of the present invention, it is able to correct the displayed image.

A method of driving the above-configured light scanner driving device according to the present invention is explained as follows.

Figure 14:
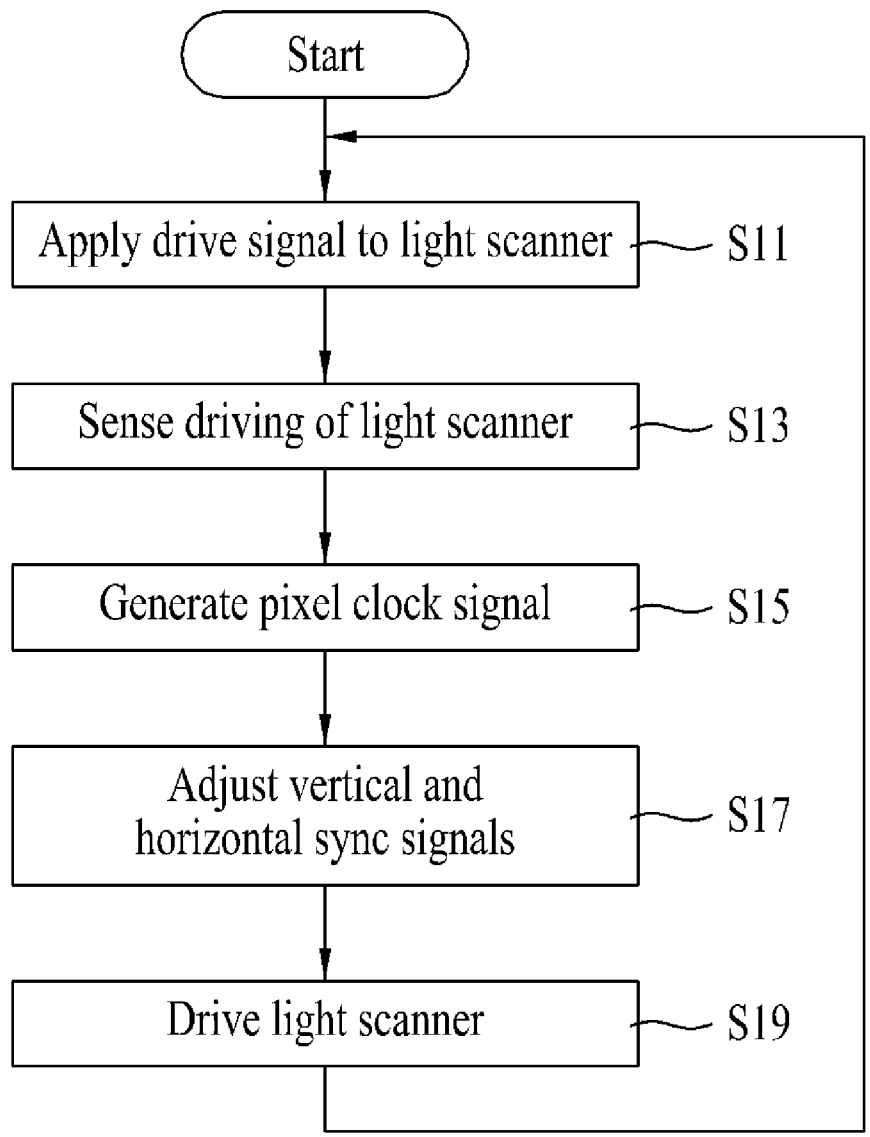
FIG. 14 is a flowchart for a method of driving a light scanner according to the present invention.

FIG. 14 is a flowchart for a method of driving a light scanner according to the present invention.

Referring to FIG. 14, if a video signal is externally inputted to the sync signal adjusting unit 17, the sync signal adjusting unit 17 separates a video signal, a vertical sync signal and a horizontal sync signal. The video signal is outputted to an external video processing unit to perform video signal processing, while the vertical and horizontal sync signals are outputted to the driving unit 19.

Subsequently, the driving unit 19 generates an initial drive signal according to the inputted vertical and horizontal sync signals and then applies the generated initial drive signal to the light scanner 11. The light scanner 11 then starts to be driven by the applied drive signal [S11].

Subsequently, the sensing unit 13 senses the driving of the light scanner 11 and then generates a sensing signal [S13].

The noise removing unit 31 removes a noise of the sensing signal generated by the sensing unit 13. The noise-removed signal is converted to a clock signal by the clock signal converting unit 33.

Subsequently, the pixel clock signal generating unit 15 generates a pixel clock signal by fixing a phase difference between the noise-removed sensing signal and the drive signal of the driving unit 19 [S15].

The sync signal adjusting unit 17 enables an inputted video signal to be stored in the memory 51 and then generates a horizontal sync signal and a vertical sync signal from the stored video signal.

And, the sync signal generating unit 53 adjusts the generated horizontal and vertical sync signals according to the inputted pixel clock signal [S17].

In this case, the horizontal sync signal can be adjusted by being shifted in a manner of enabling a descending interval, in which a horizontal drive signal of the light scanner descends high to low, to be located between pulses of the horizontal sync signal without changing a pulse width or a length between pulses.

Moreover, the vertical sync signal can be adjusted by changing a pulse width or a length between pulses to enable an ascending interval, in which a vertical drive signal of the light scanner ascends low to high, to be increased.

Subsequently, the driving unit 19 generates a drive signal according to the adjusted horizontal and vertical sync signals and then drives the light scanner 11 [S19].

Accordingly, by shifting to adjust a horizontal sync signal in a manner of enabling a descending interval, in which a horizontal drive signal of the light scanner descends high to low, to be located between pulses of the horizontal sync signal without changing a pulse width or a length between pulses and by adjusting a vertical sync signal in a manner of changing a pulse width or a length between pulses to enable an ascending interval, in which a vertical drive signal of the light scanner ascends low to high, to be increased, the present invention is able to solve a problem of changing a left/right portion of a displayed image in part, a problem of changing a top/bottom portion of the displayed image in part and/or a problem of making an overall image displayed very small.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. An apparatus for driving a light scanner, which scans an image on a screen, the apparatus comprising:
   the light scanner driven by a drive signal;
   a sensing unit sensing a driving of the light scanner;
   a pixel clock signal generating unit generating a pixel clock signal by detecting a 90-degree phase difference between the drive signal and a sensing signal sensed by the sensing unit;
   a sync signal adjusting unit adjusting vertical and horizontal sync signals of an input video according to the pixel clock signal; and
   a driving unit driving the light scanner according to the adjusted horizontal and vertical sync signals,
   wherein the sync signal adjusting unit includes a sync signal generating unit, and the sync signal generating unit adjusts the horizontal sync signal to enable a descending interval, in which a horizontal drive signal of the light scanner descends high to low, to be located between pulses of the horizontal sync signal without changing a pulse width or a length between the pulses.

2. The apparatus of claim 1, the pixel clock signal generating unit comprising:
   a phase detecting unit detecting a 90-degree phase difference between a sensing signal of the sensing unit and a drive signal of the driving unit;
   a filter unit outputting a control voltage in which a frequency component of the detected phase difference is limited; and
   a voltage control oscillating unit oscillating a frequency corresponding to the control voltage.

3. The apparatus of claim 2, further comprising a noise removing unit removing a noise of the sensing signal.

4. The apparatus of claim 2, further comprising a clock signal converting unit converting the sensing signal of the sensing unit and the drive signal of the driving unit to a clock signal, the clock signal converting unit outputting the clock signal to the phase detecting unit.

5. The apparatus of claim 1, the sync signal adjusting unit comprising:
   a memory configured to store an inputted video signal; and
   the sync signal generating unit generating the vertical and horizontal sync signals from the stored video signal, the sync signal generating unit configured to adjust the generated horizontal and vertical sync signals according to the pixel clock signal inputted from the pixel clock signal generating unit.

6. The apparatus of claim 1, wherein the adjusted horizontal sync signal is shifted according to the pixel clock signal without changing a pulse width or a length between the pulses.

7. The apparatus of claim 1, wherein the sync signal generating unit adjusts the vertical sync signal to enable an ascending interval, in which a vertical drive signal of the light scanner ascends low to high, to be increased.

8. The apparatus of claim 7, wherein a pulse width and a length between pulses of the adjusted vertical sync signal are changed.

9. A method of driving a light scanner, which scans an image on a screen, the method comprising the steps of:
   applying a drive signal to the light scanner;
   sensing a driving of the light scanner;
   generating a pixel clock signal by detecting a 90-degree phase difference between the drive signal and a sensing signal of the sensing step;
   adjusting vertical and horizontal sync signals of an input video according to the pixel clock signal; and
   driving the light scanner according to the adjusted horizontal and vertical sync signals,
   wherein the horizontal sync signal is adjusted by being shifted to enable a descending interval, in which a horizontal drive signal of the light scanner descends high to low, to be located between pulses of the horizontal sync signal without changing a pulse width or a length between the pulses.

10. The method of claim 9, the step of adjusting the vertical and horizontal sync signals of the input video, comprising the steps of:
    storing the inputted video signal;
    generating the vertical and horizontal sync signals from the stored video signal; and
    adjusting the generated horizontal and vertical sync signals according to the inputted pixel clock signal.

11. The method of claim 10, wherein the vertical sync signal is adjusted by changing a pulse width and a length between pulses to enable an ascending interval, in which a vertical drive signal of the light scanner ascends low to high to be increased.

* * * * *